United States Patent [19]

Kerfoot

[11] Patent Number: 4,829,929
[45] Date of Patent: May 16, 1989

[54] FLUID-FLOW DRAG REDUCERS

[76] Inventor: Branch P. Kerfoot, 1420 Antigua Way, Newport Beach, Calif. 92660

[21] Appl. No.: 115,864

[22] Filed: Nov. 2, 1987

[51] Int. Cl.$^4$ .............................................. F15D 1/10
[52] U.S. Cl. ...................................... 114/243; 174/42
[58] Field of Search .................. 114/243, 245; 174/42; 73/188; 441/133

[56] References Cited

U.S. PATENT DOCUMENTS

| | | | |
|---|---|---|---|
| 2,081,957 | 6/1937 | Roche | 244/35 |
| 2,154,442 | 4/1939 | Diehl | 188/103 |
| 2,435,956 | 2/1948 | Craig | 114/243 |
| 2,635,186 | 4/1953 | Schmidt | 114/243 |
| 2,859,836 | 11/1958 | Wiener | 114/243 |
| 3,461,830 | 8/1969 | Pearce et al. | 114/243 |
| 4,365,574 | 12/1982 | Norminton | 114/243 |
| 4,434,957 | 3/1984 | Moritz | 244/35 |
| 4,542,708 | 9/1985 | Holcombe et al. | 114/243 |
| 4,567,841 | 2/1986 | Hale | 114/243 |

FOREIGN PATENT DOCUMENTS 147160  5/1921  United Kingdom ............... 114/243

Primary Examiner—Joseph F. Peters, Jr.
Assistant Examiner—Jesús D. Sotelo

[57] ABSTRACT

A series of streamlining elements surrounding a cable, pole, pipe or a similar long round member in a relatively moving fluid such as water or a high wind as an arrangement to reduce drag. Contiguous, independently rotatable elements are added easily to the cable to reduce drag forces by a factor of four or more and to provide some lift.

7 Claims, 1 Drawing Sheet

FLUID-FLOW DRAG REDUCERS

SUMMARY OF THE INVENTION

The present invention is a method of adding streamlining elements to a cable or other long thin member to reduce drag forces when it is immersed in moving air, water or other fluid. The long member may be a cable, rope, pipe, wire, hose or similar shape. The drag forces act to stress the cable material and its supports and to impede flow of fluid and movement of the cable. A reduction by a factor of four or more in the forces due to drag can be achieved by streamlining the same size cable. Streamlining improves reliability and saves cost and repairs by reducing the drag forces.

For applications undersea (such as for cables or moorings subject to current) and for applications in high winds (such as for cross-country power lines) the cables presently must be designed to include major consideration of drag forces (often called water or wind resistance forces).

The streamlining elements of the present invention are added contiguously to the cable along its length, and they pivot independently and are self-aligning to orientations that present less drag than the naked cable. The elements themselves improve the smoothness of flow of fluid past the space occupied by the cable by eliminating the stagnation points ahead of and behind the cable which are responsible for drag.

The streamlining elements of this invention may also provide lift under some circumstances which will reduce further the stresses on the cable and supports.

These streamlining elements can be fabricated inexpensively by extrusion in long pieces which are chopped to size and finished on the ends.

BACKGROUND

1. Field of the Invention

When a cable, rope, hose or other long, thin member is suspended in air or another fluid like water, and there is a component of relative movement between the side of the cable and the fluid, there is a drag force due to the dynamic pressure created when the otherwise undisturbed streamlines of flow in the fluid are diverted to circumvent the cable. The suspended member, such as a cable which has a round cross-section, has stagnation points of flow both in front of and behind the cable, and is not ideally suited to allowing the fluid to flow by with minimum drag. The force due to an upstream stagnation point is not balanced by a force at the downstream stagnation point, and so drag occurs. The unbalanced drag force is proportional to fluid density and the square of the relative velocity for modest velocities.

Such a cable typically is held in tension in the fluid. Reducing the drag decreases the tension force on the cable and the stress in the supporting structure, so that both the cable and supports can be made lighter in weight, more reliable and less costly.

2. Description of the Prior Art

An Information Disclosure Statement accompanies this application.

Streamlining in fluid flow has been applied to long, thin members such as the struts on hydrofoils and older aircraft and to the guy wires used between the wings of biplanes, always by shaping the member itself to minimize the drag profile presented to the flow. The flow always came from the same direction, and so the streamlining did not need to, nor could it adapt to a changing flow direction.

Wiener (U.S. Pat. No. 2,859,836, 1958) discloses adding tear-drop shaped pieces to cables but strictly for the purpose of suppressing vibrations. The present invention avoids the vibration problem by using short pieces having a streamlined shape which are independently rotatable to prevent vibration modes.

Wiener does not claim a drag-reduction property, which is the main feature on this invention. Further, Wiener's pieces must be threaded onto the cable from the end before the cable is installed, whereas the present streamlining elements can be applied to a cable in place. Each of Wiener's pieces could rotate on the cable, though the pieces were clearly separated at isolated points along the cable. In the present invention contiguous independently rotatable elements surround the cable over the whole immersed length.

Wiener claims a blunt forward end which, when a mass is added, serves his invention by moving the center of gravity forward of the center of rotation to control vibration, whereas in the present invention these positions are reversed. In addition, the present invention specifically includes a pointed upstream end which acts functionally in a very different manner.

DESCRIPTION OF THE PREFERRED EMBODIMENT

The present invention comprises one or more streamlining elements added onto a long thin round member which is immersed in moving air, water or another fluid, as a means to minimize drag forces. The long member may be a cable, rope, pole, pipe, rod, bar, wire, marine line, halyard, tube, hose or similar shape, hereafter referred to as "cable".

Figure 1:
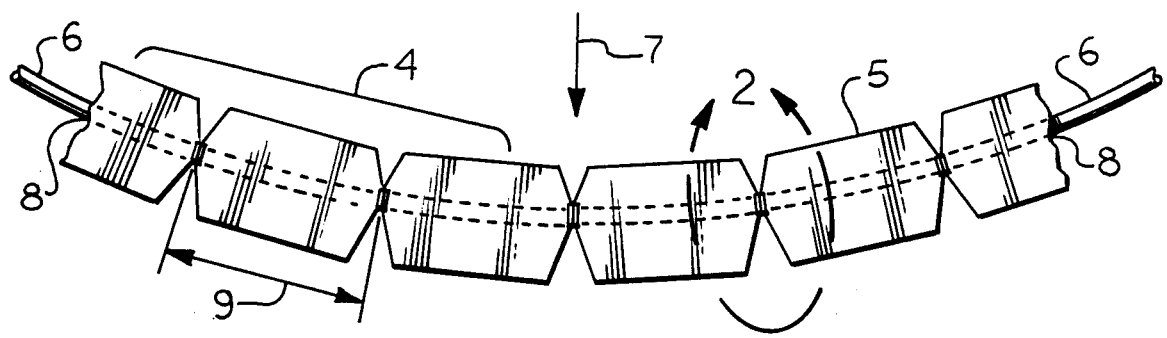
FIG. 1 is a plan view of the invention apparatus showing the series of streamlining elements assembled onto a cable immersed in flowing fluid.

In FIG. 1, a plan view the invention, a drag-reducing combination 4 of streamlining elements 5 is installed on a cable or other long thin member 6 in a fluid whose direction of flow 7 relative to the cable is from top to bottom of the drawing. The independently rotatable elements 5 are shown adjacent to each other with ends abutting and surrounding the cable 6 continuously over the length immersed in the fluid flow. A longitudinal round hole 8 passes through nearly the center of each streamlining element for passage of the cable and as a center of rotation. The relative length 9 of each element compared to its width depends on the amount of curvature and/or flexing of the cable to be accommodated without the elements binding in their rotation on the cable. Different element lengths may be used at different points along the cable, depending on the local severity of curvature.

Figure 2:
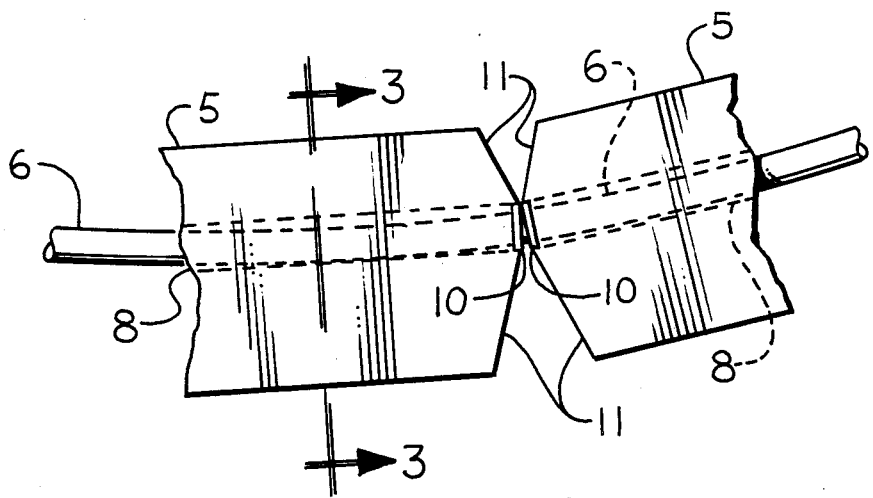
FIG. 2 is an enlarged plan view of the area between adjacent streamlining elements which shows how they rotate independently while accommodating cable curvature.

FIG. 2 is an enlargement of a portion of FIG. 1, specifically of the bearing area between the independently rotatable elements 5. Where the cable enters and/or leaves each streamlining element the element rubs together with its neighboring element, and so flat, smooth bearing surfaces 10 are provided in order that relative rotation is facilitated between elements.

In FIG. 2 beveling 11 can be seen at the ends of each streamlining element, where the beveling 11 allows independent rotation of the elements in spite of some misalignment of the longitudinal axes of two adjacent elements as may occur due to cable flexing or when the cable is in tension and is curved due to gravity or to the fluid's drag force. The severity of the beveling is chosen to be sufficient to accommodate the maximum severity of curvature expected, so as to prevent interference between the edges of adjacent independently rotatable elements.

Figure 3:
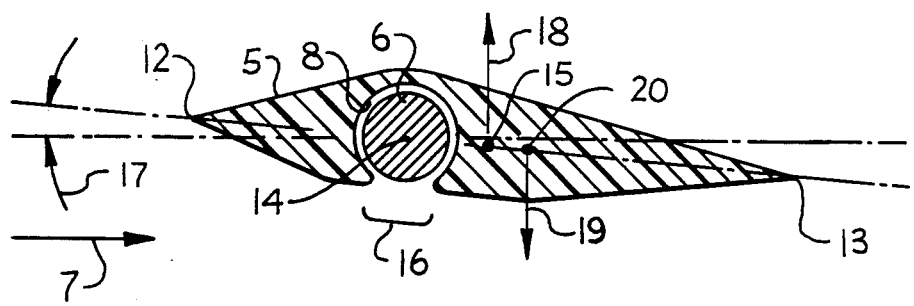
FIG. 3 presents a section view along line 3—3 of FIG. 2 of one streamlining element showing its shape, the cable location, the gap for installation onto the cable and some forces acting upon the element.

In FIG. 3 an enlarged cross-section view of a streamlining element 5 is shown including its shape, how it relates to the cable 6 and the flow 7, and showing its upstream 12 and downstream 13 pointed (or sharply rounded) ends.

The shape 5 in FIG. 3 is generally symmetrical about a line passing through the two end points. The longitudinal round hole 8 passing through the element 5 is centered on the same line in this view. The hole's diameter is selected for the cable to be used, to permit free rotation even as the cable flexes. The center 14 of the cable 6 is the center of rotation for the streamlining element. The centerline 12-13 of the streamlining element will rotate automatically to align itself with the direction of fluid flow 7, and for either direction of flow the longer tail 13 always points downstream. This relationship occurs because the center of dynamic pressure 15 is deliberately placed downstream of the center of rotation 14; the further back the more stable. The position of the center of dynamic pressure is controlled for this purpose by making the distance from the upstream point 12 to the center of rotation 14 shorter than the distance from the center of rotation to the downstream pointed end 13.

In each streamlining element 5 a gap 16 is located in the side wall to allow passage sideways of the cable 6 from the outside into the hole 8, and vice versa, as a means to allow mounting the element onto a cable in place with its ends fastened. The size of this gap 16 is chosen large enough to allow forcing the cable into it from the side, but small enough not to allow the element to slip off the cable unintentionally. Naturally the streamlining element's relatively thin wall opposite the gap 16 must provide sufficient strength to hold the streamline shape with adequate rigidity.

FIG. 3 shows the orientation of the streamlining element 5 with respect to a horizontal fluid flow 7 indicating an angle of attack 17 which occurs in the presence of gravity when the element is heavier than the weight of the fluid it displaces. With fluid flow this angle 17 causes a pitching moment and a lift force 18, here directed generally upward acting through the center of dynamic pressure 15. The angle of attack 17 occurs with horizontal flow 7 because the weight 19 of the element acting through its center of gravity 20, which is deliberately downstream from the center of dynamic pressure 15, pulls the downstream end 13 of the element downward.

There is a net positive lift on the cable due to the streamlining element when the distance between points marked 14 and 20 is greater than the distance 14-15 minus the "distance" D. D is a non-real equivalent of distance which is calculated as the ratio of the moment available for restoring alignment by means of fluid flow divided by the lift force 18, where moment divided by force has the units of distance. This relationship was developed by summing the three principal moments about the center of rotation 14, and the relationship is derived in the Appendix. Small angles less than about 20 degrees are assumed. The positive lift occurs whether or not the element's material is more or less dense than the fluid, and the lift is stable.

When there is no flow the element's centerline is stable hanging in a vertical direction. The tail is down if the element is more dense than the fluid, or tail is up if less dense (buoyant). As horizontal flow begins the center line of the streamlining element pivots about the center of rotation 14 toward a horizontal direction. The moment due to flow alone is never quite sufficient to remove totally an angle of attack between the centerline and the horizontal, because this moment is proportional to the unbalance between the lift moment and the gravity moment. This residual angle represents a condition of equilibrium between the torque due to gravity and the torques due to lift and to flow tending to align the centerline with the flow.

The lift force is proportional to the angle of attack, the density of the fluid and the flow velocity squared for nominal flow. In this invention the lift force acts beneficially to counter the force of gravity on the cable, as a means to reduce further the tension force in the cable and the forces necessary to support the cable at its ends. The net amount of lift is controlled during design by choosing the lengths of the moment arms between the center of rotation 14 and (1) the center of gravity 20 and (2) the center of dynamic pressure 15, taking into account the D ratio determined by shape.

Manufacturing cost of the streamlining elements is important when they are used to cover cables of vast lengths, such as power transmission lines subject to high winds. The material might be all-weather plastic or aluminum. The elements can be fabricated in long strips by extrusion, and be cut and finished in appropriate length pieces. Finishing comprises beveling the streamlining elements' ends at angles which avoid interference between elements during independent rotation. Also, bearing areas are formed on the ends of each element in the vicinity of the hole as a means to bear longitudinal forces from adjacent elements and to permit the freedom of independent rotation. The flowing fluid provides lubrication for this bearing action, in the fashion of an air bearing.

APPENDIX

Derivation of Distance "D"

Referring to FIG. 3, identify the aero/hydrodynamic lift force ("L") 18 as the arrow upward from the center of lift at 15, and the force of gravity as the arrow 19 downward from the center of gravity 20. Each of these forces is per unit length of the streamlining element.

The three principal moments (also per unit length) acting about the center of rotation 14 are:

1. $M_1$ is a moment to restore alignment of the streamlining element with the fluid flow vector 7, because the tail 14-13 is longer than the length 13-14 which is ahead of the center of rotation. For small angles this moment is proportional to the angle of attack ("$\alpha$") 17, so that using a positive proportionality constant $k_1$, $$M_1 = -k_1 \alpha \qquad (1)$$

where angle and moment are positive if clockwise.

2. $M_2$ is a moment due to aerodynamic or hydrodynamic lift force L acting with moment arm length ("$l_2$") 14-15, so that $$M_2 = -L*l_2 \qquad (2)$$

3. $M_3$ is a moment due to weight force acting with a moment arm length ("$l_3$") 14-20. The weight force is actually the net resultant of weight per unit length of the streamlining element minus the buoyant force due to the fluid per unit length; call this net weight "$\Delta Wt$", then $$M_3 = \Delta Wt * l_3 \qquad (3)$$

The sum of moments $M_1$, $M_2$ and $M_3$ is zero for stable equilibrium, so that $$M_1 + M_2 + M_3 = -k_1\alpha - Ll_2 + \Delta Wtl_3 = 0 \qquad (4)$$

But the lift force L is itself proportional to angle of attack, $\alpha$, so, using another proportionality constant "$k_2$"

$$L = k_2\alpha \qquad (5)$$

Combining terms from equations (4) and (5)

$$\alpha = \frac{\Delta Wtl_3}{k_1 + k_2l_2} \qquad (6)$$

and lift, $L = k_2\alpha = \frac{\Delta Wtl_3}{k_1/k_2 + l_2} \qquad (7)$

Define "D" as $-k_1/k_2$ where $k_1$ is $-M_1/\alpha$ $\qquad (8)$ $k_2$ is $L/\alpha$ $\qquad (9)$ $D = -k_1/k_2 = M_1/L \qquad (10)$ Thus D equals the aligning moment, $M_1$, divided by the lift force, L, which therefore is an equivalent of "distance" with the units of length.

Examining equation (7), in order to lift, L, to be greater than $\Delta Wt$ (so that there is a net lift)

$$L/\Delta Wt = \frac{l_3}{l_2 - D} > 1 \qquad (11)$$

$$l_3 > l_2 - D, \qquad (12)$$

or, in FIG. 3,

Distance 14-20 must be > Distance 14-15 − D. $\qquad (13)$

Since D is always positive, this condition for lift is normally met.

I claim:

1. A method of manufacture for streamlining elements installed on long cable-like members by means of a side slot on said elements, comprising the steps of: fabricating long strips using extrusion which produces a constant cross-section profile, cutting the strips into the desired lengths and finishing the ends of the lengths by beveling and smoothing.

2. A drag-reducing apparatus comprising at least one streamlining element for long thin cable-like members with generally circular cross-sections immersed in a fluid installed by means of forcibly engaging and urging said member into a longitudinal slot located on one side of said element where the element is retained on the member by having the size of the slot's opening narrower than said member's diameter.

3. A streamlining element as in claim 2 having pointed upstream and downstream ends to permit smooth flow of fluid past the member with minimum disturbance.

4. A streamlining element as in claim 2 having a center of rotation about which said element is caused to rotate due to fluid motion for automatic self-alignment for minimum drag resistance.

5. A streamlining element as described in claim 2 whose weight and whose density relative to that of said fluid and whose positions of center of gravity and center of dynamic pressure relative to said center of rotation are chosen to generate a lift force on said cable member during fluid flow by means of a positive angle of attack.

6. A drag-reducing apparatus for long thin members as in claim 2 wherein said at least one streamlining element comprises two adjoining modular streamlining elemens which rotate independently on said member to align themselves separately to minimize overall drag forces.

7. A plurality of said streamlining elements described in claim 6 having different lengths in the direction of said cable-like member, each of whose length is individually tailored to its position on the cable-like member to facilitate rotation of the elements when said member is curved in use due to drag forces, with shorter elements where curvature is greatest and longer elements used where the member is relatively straight.

* * * * *

UNITED STATES PATENT AND TRADEMARK OFFICE
CERTIFICATE OF CORRECTION

PATENT NO.    : 4,829,929
DATED         : May 16, 1989
INVENTOR(S)   : Branch P. Kerfoot It is certified that error appears in the above-identified patent and that said Letters Patent is hereby corrected as shown below:

Column 4, line 63 delete "13-14", insert --12-14--

Column 5, line 45 delete first "to", insert --for--

Column 6, lines 5 & 6 delete "positive, this condition for lift is normally", insert --negative, this condition for lift can be--

Column 6, line 41 delete "elemens", insert --elements--

Signed and Sealed this

Sixteenth Day of April, 1991

Attest:

HARRY F. MANBECK, JR.

Attesting Officer

Commissioner of Patents and Trademarks